United States Patent [19]

Rhodes

[11] Patent Number: 5,083,902
[45] Date of Patent: Jan. 28, 1992

[54] REVERTING WIND WHEEL

[76] Inventor: Winfred A. Rhodes, 1904 Plantation, Alexandria, La. 71301

[21] Appl. No.: 943,678

[22] Filed: Dec. 18, 1986

[51] Int. Cl.$^5$ .............................................. F01D 5/00
[52] U.S. Cl. ...................... 416/132 B; 416/117
[58] Field of Search ........... 416/117 R, 117 B, 139 A, 416/240 A, 131, 132 A, 132 B

[56] References Cited

U.S. PATENT DOCUMENTS

| | | | |
|---|---|---|---|
| 1,287 | 4/1810 | Wright | 416/240 A X |
| 83,620 | 11/1868 | Frazee | 416/17 |
| 175,032 | 3/1876 | Cleaver | 416/117 B X |
| 185,924 | 1/1877 | Howland et al. | 416/117 R |
| 188,139 | 3/1877 | Howland et al. | 416/117 R X |
| 325,025 | 8/1885 | Tefft | 416/139 A X |
| 469,786 | 3/1892 | Irrgang | 416/117 |
| 504,301 | 8/1893 | Davies et al. | 416/117 X |
| 609,378 | 8/1898 | Weitzel | 416/50 |
| 615,782 | 12/1898 | Bartholomew | 416/113 |
| 665,891 | 1/1901 | Fetty | 416/117 B X |
| 749,806 | 1/1904 | Rue | 416/117 X |
| 783,036 | 2/1905 | Gould | 416/117 |
| 786,297 | 4/1905 | Kenworthy | 416/17 |
| 794,706 | 7/1905 | Fine | 416/117 |
| 1,256,338 | 2/1918 | Wells | 416/117 |
| 1,352,952 | 9/1920 | Gracey | 416/240 A X |
| 1,516,668 | 11/1924 | Burch | 416/117 X |
| 1,581,537 | 4/1926 | Hennigh | 416/117 |
| 1,809,919 | 6/1931 | Turner | 416/117 |
| 1,915,689 | 6/1933 | Moore | 416/117 B |
| 2,006,024 | 6/1935 | Lockwood | 416/110 |
| 2,170,911 | 8/1939 | Raulerson | 416/117 B X |
| 2,397,346 | 3/1946 | Gimenez | 416/113 |
| 2,439,575 | 4/1948 | Morris | 416/117 |
| 2,441,635 | 5/1948 | Iverson | 416/98 |
| 2,677,344 | 5/1954 | Annis | 416/240 A X |
| 3,597,108 | 8/1971 | Mercer et al. | 416/240 A X |
| 3,810,712 | 5/1974 | Hillman | 416/117 |
| 3,920,354 | 11/1975 | Decker | 416/117 |
| 4,186,313 | 1/1980 | Wurtz | 290/44 |

FOREIGN PATENT DOCUMENTS

| | | | |
|---|---|---|---|
| 168359 | 5/1951 | Australia | 416/117 |
| 213550 | 3/1958 | Australia . | |
| 498294 | 1/1951 | Belgium | 416/117 B |
| 2644557 | 4/1978 | Fed. Rep. of Germany . | |
| 364033 | 3/1906 | France . | |
| 2288878 | 5/1976 | France . | |
| 2292878 | 6/1976 | France | 416/132 B |
| 630487 | 12/1961 | Italy . | |
| 135761 | 10/1981 | Japan | 416/117 |
| 10910 | of 1845 | United Kingdom | 416/117 |
| 188732 | 11/1922 | United Kingdom | 416/117 B |
| 2119025 | 11/1983 | United Kingdom | 416/117 R |

Primary Examiner—John T. Kwon
Attorney, Agent, or Firm—C. Emmett Pugh

[57] ABSTRACT

A windmill, comprising an axial support mounted for rotation about its vertical axis, elongated shaft sections arranged radially about the axial support, and a pair of vanes attached to each shaft section spaced about the axial support at right angles to each other for rotation about the axis of the axial support. A frame is included for attaching the shaft sections to the axial support, and a pillow block included with the frame provides a pivotal connection between the frame and shaft sections for allowing the shaft sections to rotate about their axis. A pair of counterweights attached laterally outward from each shaft section and positioned obtusely from the vanes in an alignment coaxial with its shaft section have a spaced configuration about the axial support for balancing the vanes dynamically about the axis of the axial support, when the vanes are rotated about the axis of the axial support, the counterweights further balancing the vanes axially about the shaft sections.

3 Claims, 5 Drawing Sheets

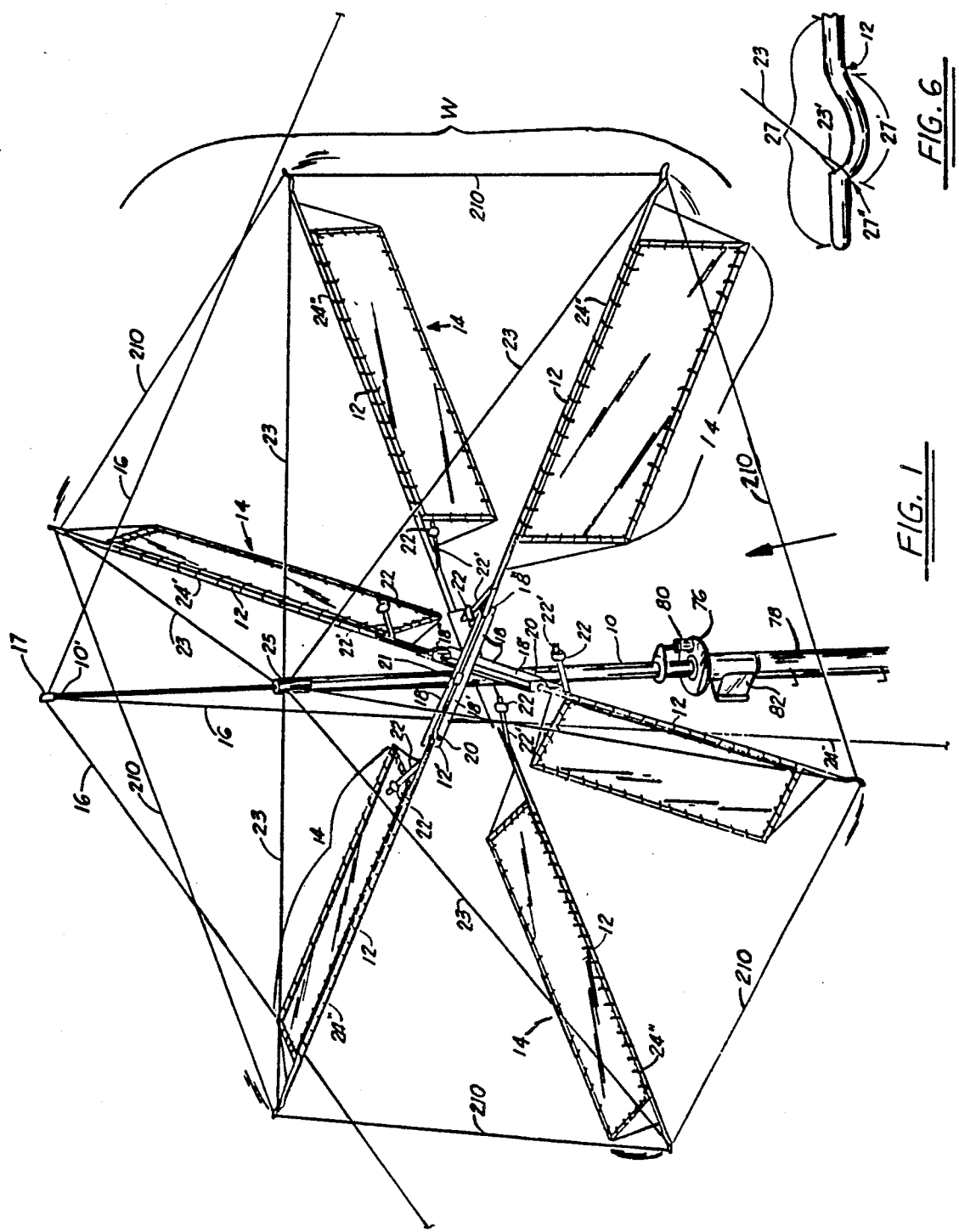

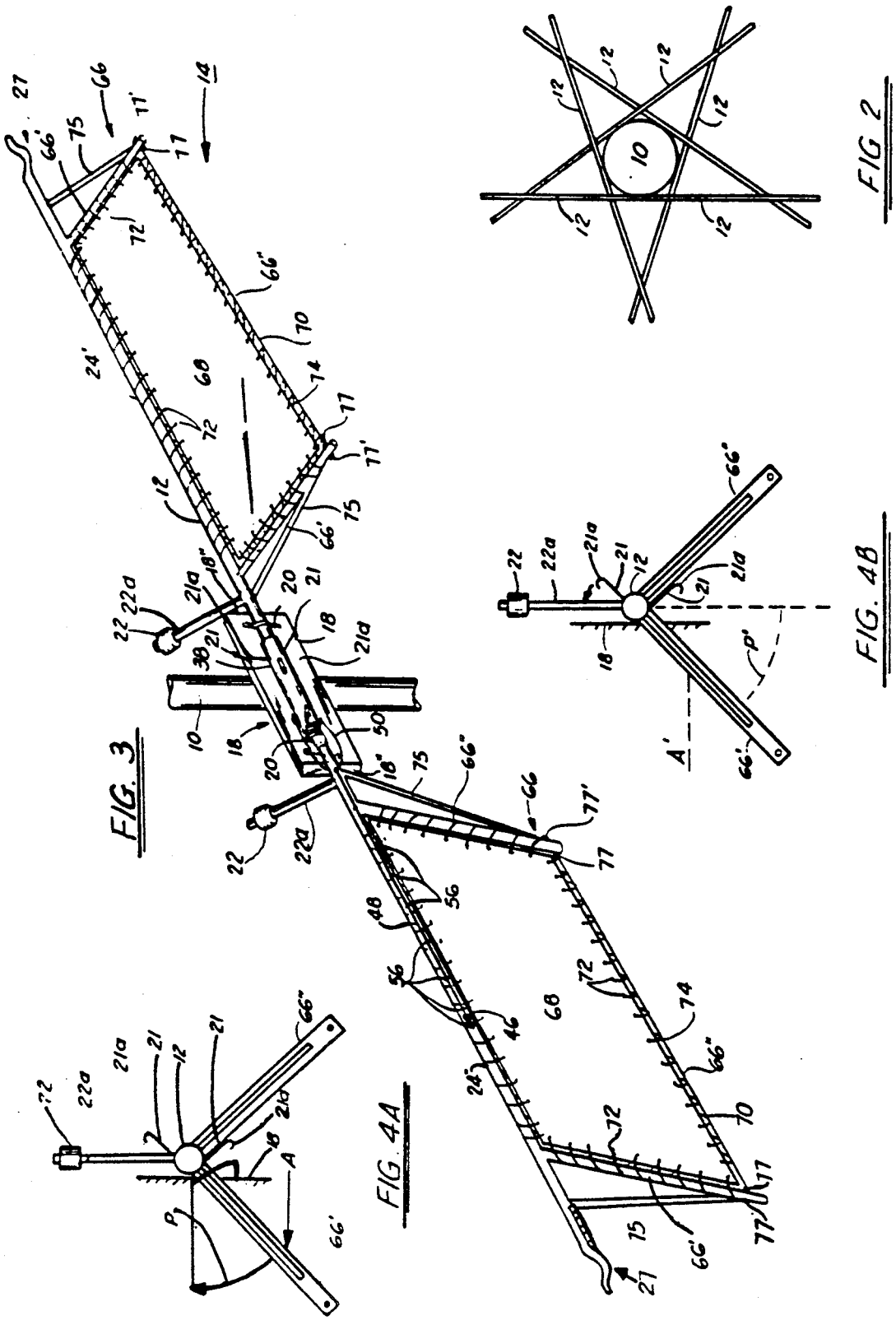

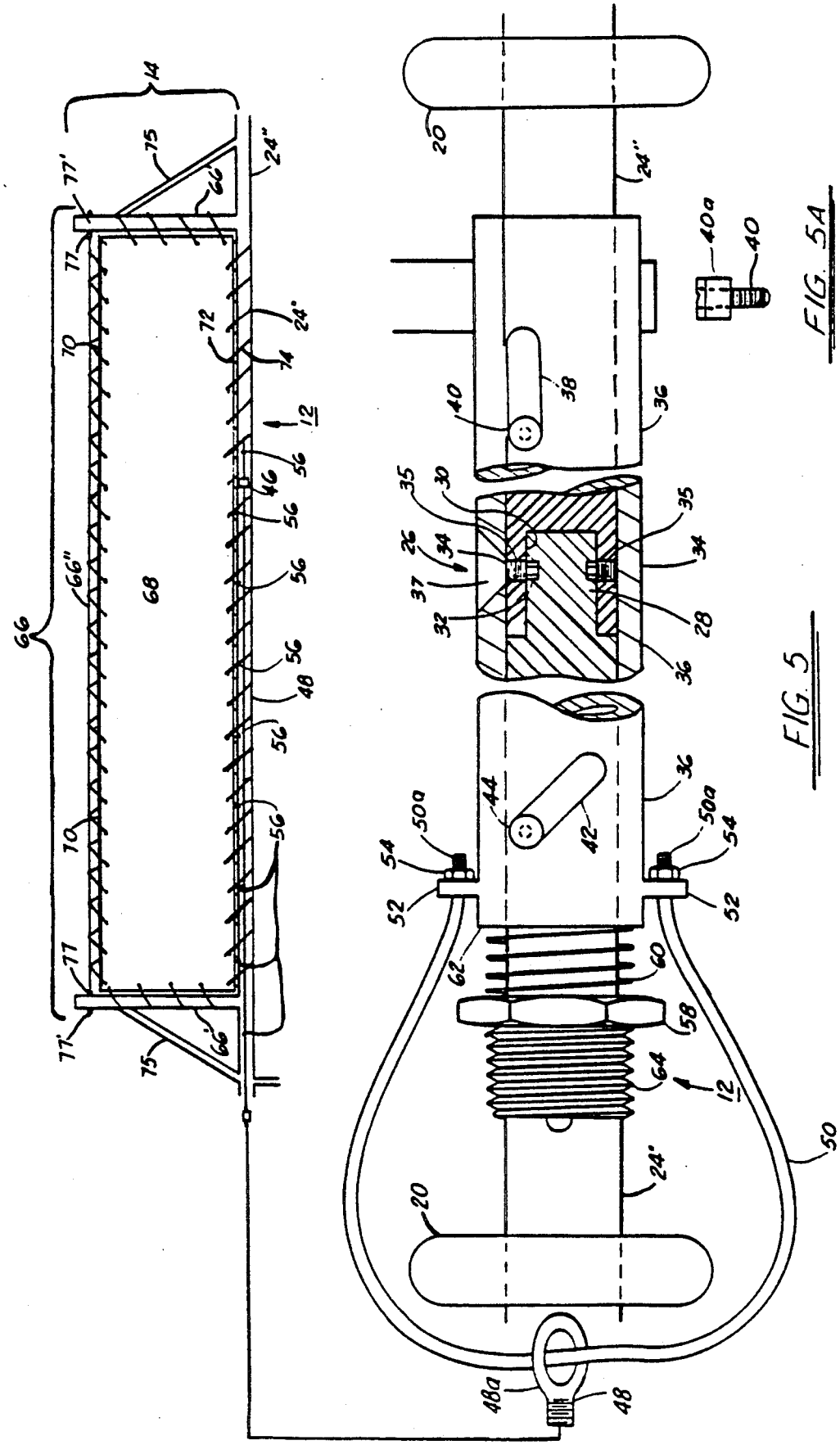

REVERTING WIND WHEEL

BACKGROUND OF THE INVENTION

1. Field of the Invention

The present invention relates generally to the field of revolving windmills, and more particularly to a windmill structure including elongated shaft sections arranged radially about an axial support, and having a pivoting vane on each shaft section spaced about the axial support.

2. Prior Art & General Background

In the past it has been the conventional practice to employ windmills for converting the strength of the wind to useful power or work. Such a conversion is extremely important in modern times, when energy supplies are being recognized as limited, and the non-polluting, almost always available source of power in the wind is an important resource to be developed.

Formerly windmills have performed various useful tasks such as pumping water, generating power and operating machinery and the like. Usually, such windmills utilize the well-known vertical plane, horizontal axis windmill, as disclosed in, for example, U.S. Pat. Nos. 1,256,338 to Liles issued Feb. 12, 1918, and 1,809,919 to Turner issued June 16, 1931, which employ rudder means to maintain the fan or blades of the mill facing into the wind, so as to maximize power output. In many instances, considerable drag is imposed on the fans, louvers or blades of the windmill, as the rotation of the mill causes the blades to meet the oncoming wind stream in a closed position.

To avoid this problem, mechanical devices have been employed for moving the blades or vanes into feathering or operating positions; however such mechanisms themselves are often complex, expensive, unwieldy and inefficient. Such prior attempts at providing automatic feathering using mechanical means are shown and described in U.S. Pat. Nos. 609,378 to Weitzel (issued Aug. 16, 1898), 3,920,354 to Decker (issued Nov. 18, 1975) and 2,006,024 to Lockwood (issued June 15, 1935). The mechanical means for positioning the blades or vanes from operating positions, normally closing air passage ways through the windmill, and in feathering positions, so that the air passageways are open to oncoming air, are slow in response to change of wind conditions and direction, so that the efficiency of the windmill is greatly reduced.

However, a class of windmills exists which does not feature a directional rudder or control mechanism. These windmills are omnidirectional and operate on the principle of rotating in a horizontal orbit as described in, for example, U.S. Pat. No. 1,581,537 to Hennigh issued Apr. 20, 1926, U.S. Pat. No. 1,915,689 to Moore issued June 27, 1933, and U.S. Pat. No. 2,441,635 to Iverson issued May 18, 1948.

With this type of windmill, the vanes are generally spaced about a vertical axial mast at right angles to each other and coupled to each other, flipping up and down as they rotate in their horizontal orbit, and, in general, have stops to limit the motion of the vanes to just a particular 90 degree oscillation.

Also, with this type of windmill and with other types of horizontally rotating windmills, arrangements have been taught for feathering the vanes, and it is well known in the art to have, for example, a rudder movable by the direction of the wind to position components for regulating the speed of the windmill. For example, Kenworthy in U.S. Pat. No. 786,297 issued on Apr. 4, 1905, uses a rudder to position a rail constituting a cam, which engages the lower portion of the blades or vanes for tilting and feathering the blades. The rail is vertically movable by means of a lever fulcrummed upon a carrier having a weight adjustable upon the lever, an arm which rises from the inner portion of the lever and a link pivoted to the upper end of the arm and pivotally connected to a vertically movable sleeve, which carries the rail for movement therewith, so that the blades may be properly feathered as they travel into the wind.

For other examples of windwheels, which use a rudder in combination with other components for regulating the speed of the windmill, see U.S. Pat. Nos. 83,620 to Frazee issued on Nov. 3, 1868, 615,782 to Bartholomew issued on Dec. 13, 1898, and 794,706 to Fine issued on July 18, 1905, and French Patent No. 2,288,878 deposited Oct. 24, 1974. For an example of a neutralizing cylinder having a piston rod adapted to be moved, for example, manually to turn all the blades or vanes to a horizontal position in such a manner to render the device inoperative, see the patent to Iverson. For an example of springs, which are used to prevent possible breaking or warping of the vanes in a high wind and are sufficiently strong to resist ordinary wind pressure for holding the vanes vertical, while yielding under excessive pressure to permit the vertical vanes to flatten out backward or with the wind, see the patent to Moore.

With the windmills such as Iverson, Hennigh and FIG. 5 of Moore, the vanes may have a natural, generally unbalanced configuration. Accordingly, it is known that outboard counterweights, as taught by Moore, may be provided which lie in positions at right angles and parallel to a wind plane respectively, may act to balance the vanes, so that they normally lie in positions at right angles and parallel to a wind plane respectively, so that they are always in a position to take advantage of the slightest breeze and allow the windmill to be capable of operating at a lower threshold of wind speed, for example, 5 m.p.h. than a 10 m.p.h. speed, as may be required by the omnidirectional windmills which are not balanced. This is because additional work has to be done in order to rotate the surfaces around the axis in conjunction with the work done in overcoming the inertia of the surfaces. Accordingly, axial balancing eliminates the additional work caused by the surfaces themselves arranged around the horizontal axis and cancels the effect of non-offset weight.

For other examples of patents for converting wind power into rotary motion, see Italian Patent No. 630,487 published in 1961, French Patent No. 364,033 published in 1906, West German Patent No. 2,644,557 published Apr. 6, 1978, and U.S. Pat. Nos. 2,439,575 to Morris issued Apr. 13, 1948, and 4,186,313 to Wurtz issued Jan. 29, 1980. For an example of a windmill which rotates in a horizontal orbit and features camming by means of a crank and slanting paths to flip the vanes up and down, see U.S. Pat. No. 2,397,346 to Gimenez issued on Mar. 26, 1946. For a further example of a patent which teaches an impulse turbine for converting rotary motion to reciprocating motion see Australian Patent No. 213,550 to Ferguson et al published in 1957.

GENERAL SUMMARY DISCUSSION OF THE INVENTION

It is an object of the present invention to provide an improved windmill of the class which is omnidirectional and rotates preferably in a horizontal orbit having a pair of vanes spaced about an axial support on a shaft section at right angles to each other, which include a pair of counterweights attached laterally outward from each shaft section and positioned obtusely between the vanes in an alignment coaxial with its shaft section and spaced from its shaft section, for balancing the vanes dynamically about the axis of the axial support, when the vanes are rotated about the axis of the axial support, the counterweights further balancing the vanes axially about the shaft sections.

It is a further object of the present invention to provide a windmill of the class which is omnidirectional and rotates in a horizontal orbit, having a flexible vane structure which is light to produce power from the wind economically. In accordance with this object, it is another object of the present invention to provide a windmill that can be activated by light winds utilizing a balance of forces around the horizontal axis.

Still yet another object of the method and apparatus of the present invention is to provide an improved windmill of the class which is omnidirectional and rotates in a horizontal orbit, which has a pair of vanes spaced about an axial support on a shaft section at right angles to each other, and includes a modulating means linearly movable on the shaft section in a direction radially from the axial support in response to increasing wind speed, for feathering the vanes by the relative rotation of the vanes toward a configuration having the vanes lying parallel to each other. In accordance with this object, the modulating means includes translating means for translating the linear motion of the modulating means to rotary motion for the relative rotation of the vanes.

The above and other features and objects of the present invention will become apparent from the drawings, the description given herein, and the appended claims.

BRIEF DESCRIPTION OF THE DRAWINGS

The invention may be more fully understood by reference to the following description of the exemplary preferred embodiment(s) in conjunction with the drawings, wherein:

FIG. 1 is an elevational view of a preferred windmill according to the method and apparatus of the present invention;

FIG. 2 is a top view of a detail of the preferred windmill according to the method and apparatus of the present invention as shown in FIG. 1, showing a preferred configuration of a plurality of shaft sections shown arranged radially about an axial support included with the windmill;

FIG. 3 is a detail perspective view of the preferred vanes of the preferred windmill according to the method and apparatus of the present invention as shown in FIG. 1, further showing the counterweights and the stops for limiting the rotation of the vanes;

FIG. 4A is a radial, end view of the vane of FIG. 3, showing one of the counterweights and indicating by phantom lines the movement of the vane in response to a wind in a direction from the front of the vane;

FIG. 4B is a second radial, end view of the vane of FIG. 3, showing one of the counterweights and indicating by phantom lines the movement of the vane in response to a wind in a direction from the rear of the vane;

FIG. 5 is a side view of a detail of a modulating means of the preferred windmill according to the method and apparatus of the present invention as shown in FIG. 1;

FIG. 5A is a detail, side view of a roller means of the modulating means of FIG. 5;

FIG. 6 is a detail side view of the ends of the shaft sections of the preferred windmill according to the method and apparatus of the present invention as shown in FIG. 1, showing its finger;

DESCRIPTION OF THE EXEMPLARY, PREFERRED EMBODIMENT(S)

Figure 7:
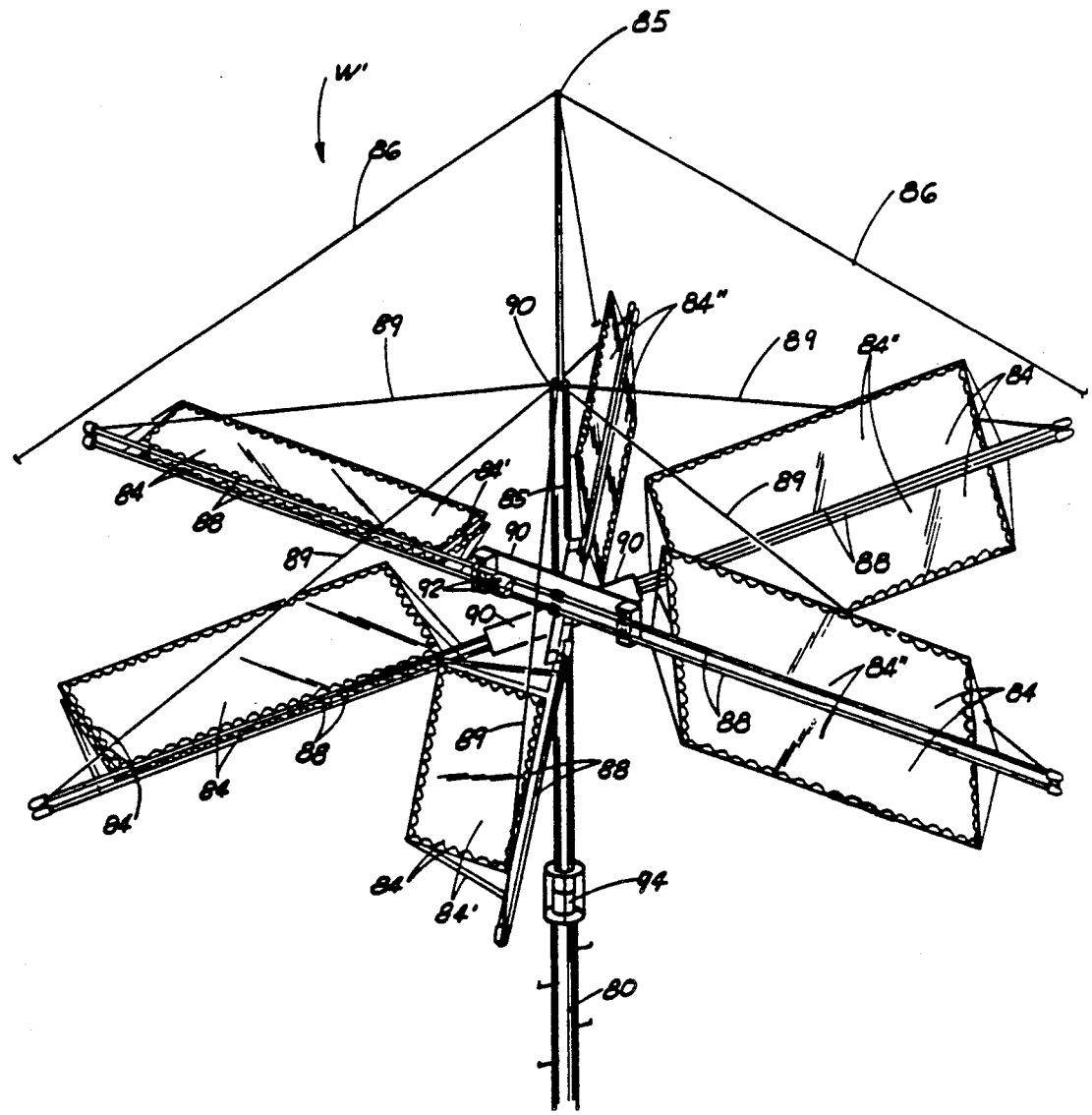
FIG. 7 is an elevational view of a second, exemplary, preferred windmill according to the method and apparatus of the present invention, similar to the embodiment of FIG. 1 but with a double set of vanes on each shaft, an upper one and a lower one.

Referring to the FIG. 1, a preferred embodiment of a windmill W according to the present invention is seen. The windmill W includes an elongated axial support 10 which is positioned generally vertically and mounted for rotation about its longitudinal axis, and a plurality of generally horizontal, elongated shaft sections 12 arranged radially about the axial support 10. A pair of vanes 14 are attached to each shaft section 12 at right angles to each other as shown in FIG. 1 in a spaced arrangement about the axial support 10 for rotation about the axis of the axial support 10. The plurality of shaft sections 12 may be six as shown in FIG. 1 and an attachment means is included for attaching the shaft sections 12 to the axial support 10 so that the support 10 rotates with the shaft sections 12.

A plurality of guy wires 16 as shown in FIG. 1 may be attached to the support 10 in a conventional manner by a support means 17 rotatively attached to the upper end 10 of the support 10' and extend radially outward and downward to attach conventionally to fixed supports, which may be located on the ground around the windmill W. The guy wires 16 are suitably tensioned for supporting the windmill W in its vertical configuration and provides additional vertical rigidity for the windmill W during adverse weather conditions.

The attachment means for attaching the shaft sections 12 to the axial support 10 may, as shown in FIG. 1, be a plurality of flat, elongated blocks 18 arranged radially around the support 10 and fixedly attached thereto by a suitable means such as welding. Included with the attachment means is a plurality of U-shaped bearings 20 arranged in pairs, with each block 18 having a pair of U shaped bearings 20 attached at their ends and aligned with their open U-shapes facing longitudinally and radially in a spaced arrangement about the support 10 with each shaft section 12 being positioned longitudinally in each pair of U-shaped bearings 20 between the U-shape and its block 18 in a configuration suitable for attaching the shaft section 12 to the axial support 10.

A pivot means is included with the attachment means for allowing the shaft sections 12 to rotate about their axis. As shown in FIG. 1, a preferred pivot means includes the U-shaped bearings 20 and a pillow face 18' of block 18 having a contacting relationship with shaft section 12, upon which each shaft section 12 may rotate about its longitudinal axis. As may be appreciated another preferred pivot means may include axially aligned roller or ball bearings suitably mounted on block 18.

A pair of stops 21 at right angles to each other are spaced about the axial support 10 along shaft sections 12 between the ends 18" of blocks 18 for limiting the rotation of the shaft sections 12 and the rotation of the vanes 14. Each stop 21, as best seen in FIG. 3, extends radially from shaft section 12 and laterally to its outboard vane 14 and includes a spring hook-like portion 21a which rotates into abutment with the face 18' of block 18 when the direction of the wind is from the front of the vane 14 as indicated by phantom arrow A, and limits the vertical upward rotation of its outboard vane 14 to a horizontal position as indicated by the phantom lines P as shown in FIG. 4A, thus preventing the vanes 14 from rotating into a wire suspension network 23 which supports the distal ends of the shaft sections 12 and holds the shaft sections 12 in their horizontal positions. Accordingly, when the direction of the wind is from the rear of the vane 14 as shown in FIG. 4B as indicated by phantom arrow A', the other stop 21 will rotate into contact with the face 18' of block 18 to limit the vertical downward rotation of vane 14 to a vertical position as indicated by phantom line P' where the wind may act on the vane 14 and cause the vanes 14 to begin to rotate.

As shown in FIG. 1, the network 23 is fixedly attached at its upper ends in a conventional manner to the axial support 10 above the vanes 14 by a conventional means such as a sleeve 25 fixedly attached on support 10. Accordingly, support 10 may include an upper elongated portion which is narrower than the bottom portion support, thus affording a shoulder on which sleeve 25 may fixedly abut, allowing network 23 to rotate with support 10, with its distal ends fixedly attached to the ends of shaft portions 12 by means such as a plurality of fingers 27 extending radially outward from the ends of shaft portions 12. As shown in greater detail in FIG. 6, the fingers 27 include a concave portion 27' which arcs downward for providing a shoulder 27" on the lower side of each finger 27 between the concave portion 27' and a radial extension of the finger 27 to which the wires of the network 23 are attached by means such as a suitable loop 23' in the lower ends of the wire network 23 for attaching the wire network 23 to the ends of the shaft sections 12 to hold the shaft sections 12 in their horizontal positions.

A peripheral chord network 210 which may be a suitable wire connects the tips of the fingers for restraining the force of the wind from causing the shaft sections 12 to bend.

A pair of counterweights 22 are attached laterally outward from each shaft section 12 by a pair of elongated rods 22a, as best seen in FIG. 3, on which the counterweights 22 are positioned. Each rod 22a extends laterally outward from shaft section 12 and may be attached thereto by, for example, a threaded bore extending radially through shaft section 12 in which the lower end of rod 22a may be threadedly engaged. Each bore is located angularly one hundred and thirty-five degrees, respectively, from vane 14 in shaft section 12 in a spaced, parallel arrangement about the axial support 10, with a rod 22a located in each bore, so that the rod 22a and counterweight 22 extend obtusely along an angle of one hundred and thirty-five degrees between its pair of vanes 14, so that the counterweights 22 are positioned obtusely between the vanes 14 in an alignment coaxial with its shaft section 12 having a spaced configuration about the axial support 10. The counterweights 22 are suitably weighted and positioned laterally outward from each shaft section 12 along rods 22a by means, such as for example an unseen set screw, for balancing the vanes 14 dynamically, as the vanes 14 rotate in a horizontal orbit about the axial support 10, and axially about the shaft sections, and as shown in the figures are further positioned inboard along the longitudinal axis of the shaft sections 12 between each pair of vanes 14.

Each shaft section 12 may include longitudinally aligned and separate elongated shaft portions 24', 24" and the shaft sections 12 are preferably of a light construction such as tubular aluminum or aluminum rod having a narrow cross section for lightness.

A rotating means is included between each pair of vanes 14 and its shaft sections 12 for the relative rotation of the vanes 14 about the axis of the shaft sections 12. As shown in FIG. 5, the shaft section 12 includes shaft portions 24', 24" which, as mentioned, are separate but connected axially by the rotating means, allowing the relative rotation of the shaft portions about their longitudinal axis for the relative rotation of the vanes 14. As shown in FIG. 5, a preferred rotating means is a rotating connection 26 between the longitudinally aligned and separate elongated shaft portions 24', 24". The rotating connection 26 includes a narrow stem portion 28 extending axially from portion 24" which is rotatively located in a larger axial counterbore 30 in the abutting end of portion 24' which is suitably dimensioned for the rotation of portion 28 therein about its longitudinal axis. An annular groove 32 surrounds stem portion 28 and a plurality of set screws 34 threadedly located in suitably threaded, radially extending bores 35 in the wall of counterbore 30 have their enclosed ends slidably positioned in groove 32, allowing the shaft portions 24', 24" to have relative rotation while retaining the shaft portions 24', 24" in an abutting but separate relationship allowing the relative rotation of the portions 24', 24" for the relative rotation of each pair of vanes 14 about the axis of its shaft section 12. As may be appreciated, an access groove 37 which extends radially through sleeve 36 gives access to the set screws 34.

A modulating means linearly movable from a first position to a second position on the shaft sections 12 in a direction radially from said axial support in response to an increasing wind speed is included for feathering the vanes 14 by the relative rotation of the vanes 14 about the shaft sections 12 from a first configuration as shown in FIG. 1 having the vanes 14 disposed at right angles to each other, toward a second feathered configuration having the vanes lying parallel to each other. A preferred modulating means as shown in FIG. 5 includes an elongated cylindrical sleeve 36 open at both ends and having a suitable inside diameter for being slidably located on each elongated shaft section 12 for linear motion thereon between a first position in which the vanes 14 are in their first configuration to a second position in which the vanes 14 are in their second configuration and feathered. As may be appreciated the shaft portions 24', 24" included with shaft section 12 may be of an equal length to position the midpoint of sleeve 36 along the longitudinal axis of the axial support 10, although the shaft portions 24', 24" may also be made of unequal length, positioning sleeve 36 on either side of the axial support 10.

Included with sleeve 36 is an elongated, longitudinal slot 38 coaxial with its shaft section 12 which extends radially through the wall of the sleeve 36 and communicates with an elongated shaft portion 24' included with shaft section 12. Included with the modulating means is a roller means in the form of a pin 40 which extends radially outward from the surface of shaft portion 24' and is slidably located in longitudinal slot 38. The pin 40 extends radially through slot 38, and as best seen in FIG. 5A, may include a rotating sleeve 40a having a suitable diameter for the longitudinal motion of pin 40 along the length of slot 38, allowing sleeve 36 to have linear motion on the shaft portions 24', 24" between its first and second position.

Also included with the modulating means is a translating means for translating the linear motion of the modulating means to rotary motion for the relative rotation of the vanes 14 as the sleeve 36 moves between its first and its second position. Included with the translating means is an elongated, angular slot 42 in sleeve 36 having a projected length along the axis of shaft section 12 generally equal to the longitudinal length of slot 38. The angular slot 42 is spaced longitudinally along the axis of shaft section 12 from longitudinal slot 38 and angularly to longitudinal slot 38, with the slot 42 extending radially through the wall of the sleeve 36 to communicate with a second elongated shaft portion 24" included with shaft section 12.

Included with the translating means is a second roller means in the form of a pin 44 which may be similar to pin 40. As shown in FIG. 5, pin 44 extends radially outward from the surface of shaft portion 24" and is slidably located in angular slot 42 by means of, for example, a similar rotating sleeve as pin 40. The pin 44 extends radially through slot 42 and has a suitable diameter for slidable motion therein along the angular length of slot 42, allowing the linear motion of sleeve 36 between its first and its second position to be translated into a rotary motion to rotate the second shaft portion 24" relative to the first shaft portion 24'.

As shown in FIG. 1, each shaft section 24', 24" includes a vane which are positioned at right angles to each other and located in a spaced relationship about the axial support for forming each pair of vanes 14. Accordingly, the translating means for translating the linear motion of sleeve 36 for the relative rotation of the shaft sections 24', 24" translates the linear motion of the modulating means to rotary motion for the relative rotation of each pair of vanes 14, allowing the vanes 14 to be feathered by undergoing relative rotation from their first configuration as shown in FIG. 1, toward a second configuration having each pair of vanes 14 lying parallel to each other.

A biasing means coupled to sleeve 36 and responsive to an increasing wind speed is included with the modulating means for causing sleeve 36 to move linearly along shaft section 12 in a direction radially from axial support 10 from its first position toward its second position. A preferred biasing means as shown in FIG. 5 includes a suitable weight 46 attached to the second shaft portion 24" for longitudinal movement along the second shaft portion 24" in a direction radially outward from the axial support 10. As shown in the FIG. 5, weight 46 is coupled to sleeve 36 by a thin rod 48 or other suitable material fixedly attached to weight 46 which extends radially inward therefrom along shaft portion 24" and attaches to sleeve 36 by a suitable means such as a U-shaped cable 50 which passes through a loop 48a at the inward end of rod 48. The cable 50 is fixedly attached at its ends 50a to sleeve 36 by a suitable means such as, for example, crimp clamping its ends 50a and passing the ends 50a through suitable bores in a pair of lugs 52 that extend radially outward from the body of sleeve 36 for retaining the ends 50a.

The biasing means is attached to the second shaft portion 24" by a plurality of guides 56 spaced longitudinally along the length of second shaft portion 24" through which rod 48 slidably extends for longitudinal movement along the axis of the second shaft portion 24". The guides 56 include axially aligned openings through which rod 48 extends, with the openings having a suitable dimension for the slidable motion of rod 48 therein.

The weight 46 is coupled to sleeve 36, allowing for the translatory motion of sleeve 36 therewith from its first position toward its second position therewith, sliding sleeve 36 on the elongated shaft portions 24', 24" for the relative rotation of the vanes 14. As may be appreciated weight 46 tends to move radially outward with increasing wind speed and the modulating means includes a resistance means interactive with the biasing means for controlling the linear displacement of sleeve 36 from its first position toward its second position in response to increasing wind speed and the amount of feathering of the vanes 14.

Included with the resistance means is a stop means on the second shaft portion 24" spaced axially along second shaft portion 24" from sleeve 36, and a second biasing means positioned between the stop means and sleeve 36 for controlling the linear displacement of sleeve 36 in response to increasing wind speed, and the amount of feathering of the vanes 14.

As shown in FIG. 5, a preferred stop means includes an annular stop 58 surrounding second shaft portion 24", and a preferred second biasing means includes a helical spring 60 surrounding second shaft portion 24" positioned between stop 58 and an annular shoulder 62 surrounding an end of sleeve 36 having an abutting relationship with helical spring 60, the linear motion of sleeve 36 during feathering compressing the helical spring 60 and providing a limited spring force for controlling the linear displacement of the sleeve 36 in response to increasing wind speed and the amount of feathering of the vanes 14.

Further included with the modulating means is a means for further rotating the vanes 14 from their second configuration in which the vanes 14 are feathered to their first configuration having the vanes 14 disposed at right angles to each other in response to a decreasing wind speed. As shown in FIG. 5, a preferred means for rotating the vanes 14 from their second configuration of their first configuration, includes the helical spring 60 compressively biasing against stop 58 and annular shoulder 62 for providing a spring force to linearly return the sleeve 36 from its second position to its first position in response to decreasing wind speed, the translating means in a similar manner further translating the linear motion of the sleeve 36 into a rotary motion for the relative rotation of the vanes 14 from their second configuration toward their first configuration.

As may be appreciated, the modulating means may further include an adjustment means for controlling the amount of displacement of the sleeve 36 and the amount of feathering of the vanes 14. As shown in FIG. 5, a preferred adjustment means is the annular stop 58, the annular stop 58 further being threadably attached along a threaded portion 64 along the second shaft portion for allowing the linear motion of the annular stop 58 along the second shaft portion 24" for controlling the resistance means and regulate the amount of feathering of the vanes 14.

As may be further appreciated, shaft portion 24', 24" may have unequal lengths, positioning sleeve 36 on either side of axial support 10. Accordingly with axial support 10 positioned between sleeve 36 and the biasing means, the linear motion of sleeve 36 will be in a direction radially inward toward the axial support 10. However, with sleeve 36 positioned between axial support 10 and the biasing means, the linear motion of sleeve 36 will be in a direction radially outward from the axial support 10.

As shown in FIG. 3, each vane 14 includes a frame 66 which includes a pair of radially spaced, elongated rigid arms 66' extending laterally outward from each shaft section 12 joined by a cable 66" tensively mounted therebetween for extending generally coaxial shaft section 12 and spaced from the shaft section 12. The cable 66" extends between the arms 66' and is attached thereto by a suitable means such as eyelets 77 which extend through an unseen bore in the arms 66', with the eyelets 77 being provided with a suitable fastener such as a nut 77' on its threaded end for drawing the ends of the cable 66" apart to apply a suitable tension to cable 66" for stretching the cable 66" between the arms 66', and as may be appreciated, the shaft section 24" forms the bottom portion of the frame 66.

Each frame 66 preferably has a suitable elongated dimension along the axis of the shaft sections, with a suitable dimension being, for example, generally 6 times the later dimension of the frame 66. Included with vane 14 is a light, flexible wind plane 68 which extends between arms 66', cable 66" and shaft section 24". The wind plane 68 may be of any suitable material which is light, with a suitable material being a cloth such as a polyester or a suitable sailcloth. The wind plane 68 is attached between arms 66', cable 66" and shaft section 24" uncontinuously around its periphery 70. As shown in FIG. 3, a preferred means for attaching wind plane 68 to frame 66 includes a plurality of grommets 72, which may be brass for example, spaced around the periphery of the wind plane 68, and a flexible cord 74 of a suitable material such as nylon which passes through sequentially through each grommet 72 and around the frame 66 in a spiraling arrangement between the grommets 72 and the frame 66 including cable 66" for attaching the wind plane 68 uncontinuously along its periphery to the frame 66. Angular supports 75 extending angularly between shaft section 12 and an upper portion of arms 66' provide additional rigidity to the frame 66 while helping maintain tension on cable 66".

As may be appreciated, having the shaft sections 12 and the vanes 14 of a light structure allows for a windmill W which is very responsive to light winds, allowing the windmill W to produce power at a lower wind threshold than possible with other prior windmills.

Further, the unique counterweights of the present invention allow for the vanes 14 to exhibit a higher threshold of dynamic stability at higher wind speeds than with, for example, wind machines without some form of balancing. As may be further appreciated, the unique modulating means of the present invention allows the vanes 14 to be feathered for those conditions such as heavy windstorms when the wind velocity exceeds the capacity of the windmill W. As may be further appreciated, its biasing means may be adjusted by means of annular stop 58 which is linearly movable for controlling the resistance means and regulate the amount of feathering of the vanes 14.

The axial support 10 may be supported in any way that will permit free rotation and ready transmission of power therefrom when used as a power generating device. In the present instance as shown in FIG. 1, a suitable bearing 76 positioned at the upper end of a generally vertical tubular support 78 fixed at its lower end to, for example, the ground, rotatively supports the lower end of the axial support 10 for allowing the axial support 10 to rotate about its longitudinal axis. As further shown in FIG. 1, a generator 80 may be attached to support 78 which is driven by, for example as shown in the figure, a gear 81 surrounding the axial support 10 for rotation therewith which transmits rotary power to the generator 80 in a conventional manner. Further included with the support 78, may be a gin pole support 82 for aiding in the vertical positioning of the support 82 during installation of the windmill W.

A further preferred embodiment is shown in FIG. 7. The windmill W' is similar to the embodiment of FIG. 1 but with a double set of vanes 84 on each shaft, with each set of vanes having an upper vane and a lower vane. The vanes 84 are similar to vanes 14 and may have a length to width ratio of 6 to 1.

A plurality of guy wires 86 as shown in FIG. 7 may be attached in a similar manner to a support 85 which is similar to support 10 in a similar manner as the embodiment of FIG. 1 and extend in a similar fashion readily outward and downward to attach conventionally to fixed supports which may be located on the ground around the windmill W' as in the previous embodiment. As appreciated the guy wires are suitably tensioned for support of the windmill W' in its vertical configuration and provides additonal vertical rigidity for the windmill W' during adverse weather conditions. Spaced radially about support 85 are a plurality of generally horizontal, vertically spaced pairs of parallel elongated shaft sections 88 spaced apart in a somewhat close relationship vertically. As shown in the figure, each shaft section 88 is journaled in suitable bearings 20' spaced horizontally outward a suitable distance from a bearing block 90 fixedly attached to axial support 85. As shown in the figure, each different pair of shafts 88 are spaced vertically from each other so that they may all project radially around support 85 without interference. Each shaft 88 includes a pair of vanes 84 which are attached to each shaft section 88 at right angles to each other as shown in FIG. 7 in a spaced arrangement about axial support 85 for rotation about the axis of the axial support 85. Each pair of vanes 84, however, are fixed on the respective shafts 88 so that they lie in planes at right angles to those of the opposite pair, or in such a relationship that when the vanes 84' are vertically disposed, the opposite pair 84" are horizontally disposed and superimposed in a facing relationship to each other, and extending rearwardly of the shafts 88 relative to the direction of rotation of the wind wheel W'.

Figure 10:
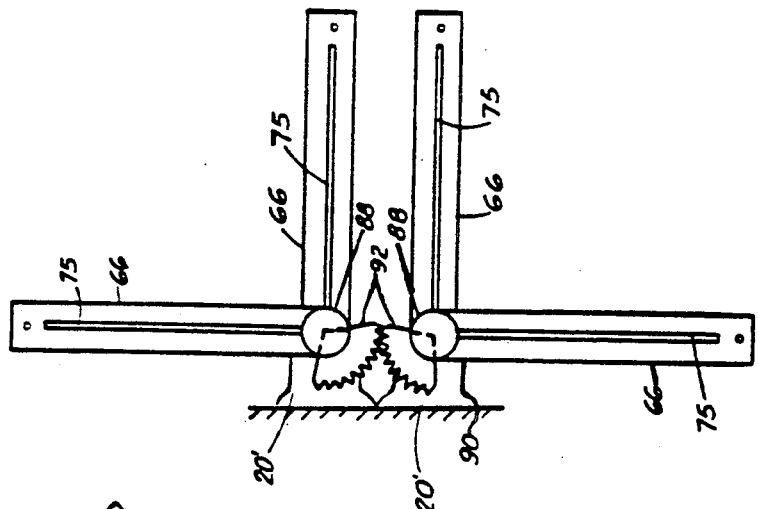
FIGS. 8–10 are end views of the double set of vanes and their vertically spaced shaft sections, showing the vanes in various positions relative to each other.

The vertical vanes 84' then are in a position to be efficiently engaged by the wind and cannot swing or lean back with the wind on account of an engagement of the folded vanes with each other. The shafts 88 are connected together by segment gears as shown in FIGS. 8, 9, and 10 which are arranged so that the pairs of vanes will positively fold and unfold together.

Figure 9:
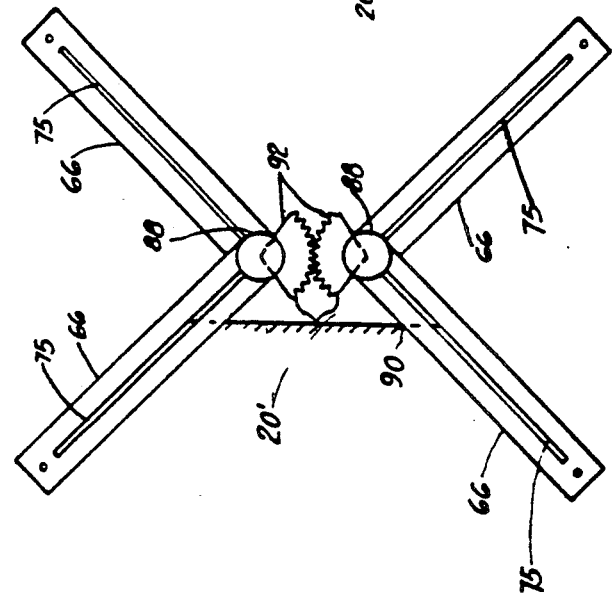
Figure 8:
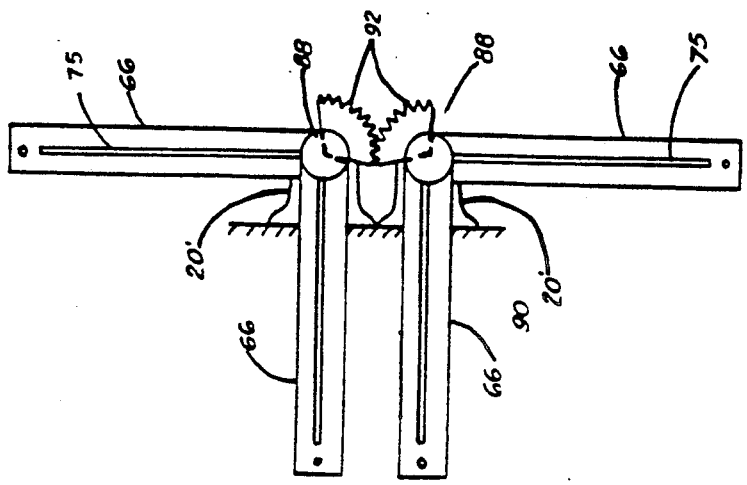

As soon as any vane unit with the rotation of the wind mill W' turns so that its corresponding shafts are moved beyond a position parallel to the wind plane, the wind begins to act on the back faces of the vertical vanes 84' starting to close or fold them, while opening the closed vanes 84", as indicated in FIG. 8, with the intermediate position of the vanes 84', 84" being shown in FIG. 9. At the same time, the wind also presses between the closed or folded vanes, forcing them open and also imparts a closing movement to the other vanes. With a further rotation of the wind mill W', the opening and closing of the previously closed and unopened vanes is completed, the previously closed vanes being now in a position to be fully engaged by the wind, as shown in FIG. 10, and when the vane unit again turns it moves out of the wind the relative position of the opposed pairs of vanes is again reversed.

Further, windmill W' may be provided with suitable counterweights similar to the embodiment of FIG. 1. Accordingly, the counterweights would be positioned obtusely between each pair of vanes 84 on a shaft section 88 by means of a concave portion which extends from shaft section with the counterweight being positioned along the concave portion near its distal end. As may be appreciated, the arc of the concave portion would be positioned relative to its spaced shaft section 88 to allow the shaft section 88 to rotate without interference from the counterweights and its spaced shaft section 88.

In operation, annular stop 58 will be suitably positioned by the user along threaded portion 64 in a suitable location thereon to control the feathering of the vanes 14 in relationship to wind speed and the desired power output of the windmill W, W'. Under conditions of no apparent winds, or winds below the operating threshold of the windmill W, W', the vanes 14, 84, will hang in their first configuration at right angles to each other about the axial support 10, and may hang with the vanes 14, 84 disposed in any disposition about the axis of the shaft sections 12 due to the balancing from the counterweights 22, including having some of the vanes 14, 84 generally vertical and some only partially vertical.

When the direction of the wind is from behind a vane 14 which is positioned at least partially vertical, as indicated in FIG. 4A, the at least partially vertical vane 14, 84, will rotate downward to its vertical position or remain vertical, and the vanes 14, 84 will begin to rotate. However, if the direction of the wind is from in front of an at least partially or vertical vane 14, as indicated in FIG. 4, the at least partially vertical or vertical vane 14, 84 will be flipped to a horizontal position, flipping its paired horizontal vane 14, 84 to a vertical position, where the direction of the wind is from behind the now vertical vane 14, 84, and the vanes 14, 84 will begin to rotate.

As the vanes 14, 84 begin to rotate, the vanes 14, 84 will retain their first configuration, and the vanes 14, 84 will alternately be flipped vertically and horizontally in response to the wind, so that the wind coming from the rear will act on the vanes 14, 84 having their backside at least partially aligned with the rearward wind, causing the vanes 14, 84 to rotate. For those vanes 14, 84 approaching the wind with the wind coming from in front of the vanes 14, 84, flipping to a horizontal position will occur along with flipping of its paired vanes 14, 84 to a vertical position, where they may be acted upon by the wind coming from behind, and the vanes 14, 84 will rotate in response to the wind about the horizontal axis of the axial support 10, with the counterweights 22 providing a dynamic balance as the vanes 14, 84 rotate.

Depending on the wind velocity, the vanes 14, 84 will have an increasing rotational velocity, and, when the vanes 14, 84 have reached a limiting rotational velocity as set by the manipulation of annular stop 58 and, for example, the desired power output of the windmill W, W', the blades 14, 84 will be feathered by the modulating means, including the biasing means which is responsive to increasing wind speed for causoing sleeve 36 to move linearly along shaft section 12, 88 in a direction radially from the axial support 10. The translating means included with the modulating means translates the linear motion of the modulating means into rotary motion for the relative rotation of the vanes 14, 84 about their horizontal axis to a feathered second configuration having the vanes 14, 84 lying parallel in a generally horizontal plane and rotating the counterweights 22 about the axis of the shaft sections 12, 88 toward a second position in which the counterweights 22 lie at right angles to each other. As may be appreciated, this reduces the dynamic balancing of the counterweights 22 and adds an additional resistive force to the rotation of the vanes 14, 84, further aiding in the feathering of the vanes 14, 84.

As may be appreciated, as the wind velocity decreases, the resistance means interacting with the biasing means returns sleeve 36 to its first position, with the translating means further translating the linear motion of the sleeve 36 into a rotary motion for the relative rotation of the vanes 14, 88 from their feathered configuration to their first configuration and the rotation of the counterweights 22 to their first position coaligned with the axis of its shaft section 12, 88.

As may be further appreciated, the vanes 14, 88 may be feathered by increasing wind speed to any configuration between their first configuration and their second configuration. Likewise the couterweights 22 may be rotated to any position between their first position coaxial with its shaft section 12, 88, and a second position having the counterweights lying at right angles to each other for further feathering the vanes 14, 88.

The foregoing disclosure and description of the preferred embodiment(s) of the invention are illustrative and explanatory thereof, and various changes in the method steps as well as in the details of the illustrated apparatus may be made within the scope of the appended claims without departing from the spirit of the invention.

What is claimed is:

1. A windmill, comprising:
   an axial support mounted for rotation about its axis;
   a plurality of elongated shaft sections arranged radially about said axial support;
   attachment means for attaching said shaft sections to said axial support;
   a pair of vanes on each shaft section spaced about said axial support at right angles to each other for rotation about the axis of said axial support;
   rotating means between said vanes and said shaft sections for the relative rotation of said vanes about the axis of said shaft sections;
   pivot means included with said attachment means for allowing said shaft sections to rotate about their axis; and
   modulating means linearly movable from a first position to a second position on said shaft sections in a direction radially from said axial support in response to an increasing wind speed for feathering said vanes by the relative rotation of said vanes about said shaft sections from a first configuration having said vanes disposed at right angles to each other, toward a second feathered configuration having said vanes lying parallel to each other, said modulating means including translating means for translating the linear motion of said modulating means to rotary motion for the relative rotation of said vanes said modulating means further comprising a sleeve slidably located on each elongated shaft section for linear motion thereon in a direction radially from said axial support, said sleeve including an elongated, longitudinal slot coaxial with said shaft section extending radially through said sleeve to an elongated shaft portion included with said shaft section, and an elongated, angular slot included with said translating means and spaced longitudinally along said shaft section from said longitudinal slot and positioned angularly to said longitudinal slot extending radially through said sleeve to a second shaft portion included with said shaft section and longitudinally aligned with and separate from said first shaft portion; each shaft portion including a vane at right angles to each other and spaced about said axial support for forming said pair of vanes; and wherein there is further included a roller means extending radially outward from said first elongated shaft portion slidably located in said longitudinal slot for linear motion of said sleeve on said shaft portions;

a second roller means included with said translating means and extending radially outward from said opposite elongated shaft portion and located in said angular slot for translating the linear motion of said sleeve into a rotary motion to rotate said second shaft portion relative to said first shaft portion for the relative rotation of said vanes from said first configuration toward said second configuration in which said vanes are feathered; and biasing means attached to said sleeve responsive to an increasing wind speed for causing said sleeve to move linearly along said shaft section in a direction radially from said axial support.

2. The windmill of claim 1, wherein said biasing means includes a weight attached to said second shaft portion for longitudinal movement along said second shaft portion in a direction radially outward from said axial support, said weight being coupled to said sleeve for the translatory motion of said sleeve therewith, sliding said sleeve on said elongated shaft portions with linear motion for the relative rotation of said vanes.

3. The windmill of claim 1, wherein said longitudinally aligned shaft portions are separate but connected axially by said rotating means, allowing the relative rotations of said shaft portions about their longitudinal axis for the relative rotation of said vanes.

* * * * *